United States Patent [19]
Gousetis et al.

[11] Patent Number: 4,810,404
[45] Date of Patent: Mar. 7, 1989

[54] NITRITE- AND PHOSPHATE-FREE GLYCOL-BASED COOLANT MIXTURES

[75] Inventors: Charalampos Gousetis; Knut Oppenlaender, both of Ludwigshafen; Gert Liebold, Edingen-Neckarhausen; Guenter Frey, Dannstadt-Schauernheim, all of Fed. Rep. of Germany

[73] Assignee: BASF Aktiengesellschaft, Ludwigshafen, Fed. Rep. of Germany

[21] Appl. No.: 160,996

[22] Filed: Feb. 26, 1988

[30] Foreign Application Priority Data

Mar. 14, 1987 [DE] Fed. Rep. of Germany .... 3708298

[51] Int. Cl.$^4$ ................................................ C09K 5/00
[52] U.S. Cl. ........................................ 252/75; 252/76; 252/78.3; 252/78.5; 252/389.3; 252/389.4; 252/396
[58] Field of Search ................. 252/75, 76, 78.3, 78.5, 252/389.3, 389.4, 396

[56] References Cited

U.S. PATENT DOCUMENTS

| | | | |
|---|---|---|---|
| 3,780,127 | 12/1973 | Young et al. ...................... | 585/639 |
| 3,816,550 | 6/1974 | Young et al. ...................... | 568/898 |
| 3,912,774 | 10/1975 | Kotzsch et al. ............... | 260/448.8 R |
| 4,242,214 | 12/1980 | Lambert, Jr. ......................... | 252/76 |
| 4,370,255 | 1/1983 | Plueddemann ...................... | 252/78.5 |
| 4,452,715 | 6/1984 | Hirozawa ................................ | 252/75 |
| 4,629,602 | 12/1986 | Gousetis et al. ....................... | 252/75 |
| 4,676,919 | 6/1987 | Zientek .................................. | 252/75 |

FOREIGN PATENT DOCUMENTS

61694 10/1982 European Pat. Off. .
206676 12/1983 Japan .

OTHER PUBLICATIONS

J. Org. Chem. 25, 1191 (1960).
Organosilicon Perivatives of Phosphorus and Sulfur by S. N. Borisov, M. G. Voronkov and E. Ya. Lukavits, Plenum Press, N.Y.–London 1971, p. 94.

*Primary Examiner*—Robert A. Wax
*Attorney, Agent, or Firm*—Keil & Weinkauf

[57] ABSTRACT

Glycol-based coolant mixtures which are free of nitrites and phosphates contain alkali metal salts of bis(carboxyalkyloxyphenyl)-2,2-propane and stabilized silicate and also further corrosion-inhibiting additives.

3 Claims, No Drawings

NITRITE- AND PHOSPHATE-FREE GLYCOL-BASED COOLANT MIXTURES

The present invention relates to nitrite- and phosphate-free glycol-based coolant mixtures containing alkali metal salts of alkylenebisphenoxycarboxylic acids, silicates and silicate stabilizers.

Modern coolants for internal combustion engines usually contain glycols (ethylene glycol or propylene glycol) as the main component. In the cooling system, they are diluted with water and are intended to provide not only antifreeze protection but also efficient heat transfer. Yet glycol/water mixtures are highly corrosive at the high operating temperatures of internal combustion engines and for that reason various metals and metal alloys present in the automotive cooling system need to be adequately protected from corrosion.

This function is performed by the various additives (corrosion inhibitors) present in coolants, for example alkali metal nitrates, alkali metal nitrites, alkali metal silicates, benzoates, alkanolamines, phosphates, triazoles and the like aside from sodium hydroxide or potassium hydroxide and alkali metal borates which ensure an adequate alkali reserve to neutralize acidic oxidation products.

Nitrites are some of the most effective corrosion inhibitors for iron. On the other hand, they can react with primary and secondary amines to form highly toxic nitrosamines. This can happen in particular on mixing different types of coolant, for example when topping up an automotive radiator.

Problems can also occur in the use of phosphates, which are able to confer protection not only on iron but also on aluminum (through formation of passivating layers), in particular when the admixed water is of high hardness. The resulting alkaline earth metal phosphate precipitates can lead to difficulties, for example due to poor heat transfer, due to errosion or even due to radiator blockages.

It is an object of the present invention to prepare coolants which are amine-, nitrite- and phosphatefree and which, nonetheless, provide adequate protection for the metallic materials present in the cooling system.

Japanese Laid-Open Application No. 83/206,676 describes coolants which, in addition to monoethylene glycol and water as principal components, contain triethanolamine phosphate, sodium phosphate, benzotriazole and salts, in particular triethanolamine salts, of acids I

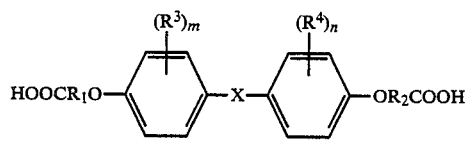

where
R$^1$, R$^2$, R$^3$ and R$^4$ are each hydrocarbyl,
m and n are each 0, 1, 2 or 3, and
X is —O—, —S—, —SO$_2$—, —SO— or hydrocarbyl,
which acids may be ring-hydrogenated.

The chief disadvantage of these formulations, however, is their phosphate content, which can lead to the problems described above.

DE-A1-No. 3,440,194 discloses cooling fluids which contain organosilane-silicate copolymers as corrosion stabilizers. However, the coolant mixtures described therein require sodium nitrite, which has the abovementioned disadvantages.

We have found, surprisingly, that the object is achieved with a very actively corrosion-inhibiting formulation which contains no phosphate or nitrite additives but, in addition to ethylene glycol and/or propylene glycol and water contains (a) 1–5% by weight of an alkali metal salt of acid II

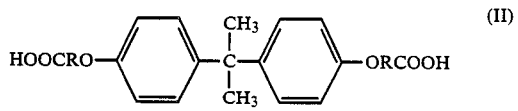

where R is a

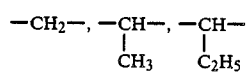

or CH$_2$CH$_2$CH$_2$ group, (b) 0.1–1% by weight of a silicate of the general formula III

where M is an alkali metal and q is from 0.4 to 4,
(c) 0.01–0.2% by weight of a silicate stabilizer,
(d) 0–0.5% by weight of an alkali nitrate,
(e) 0.05–0.2% by weight of benzotriazole or tolytriazole,
(f) 0.5–2 % by weight of borax, and
(g) 0.05–1 % by weight of NaOH, all the percentages being based on the glycol present in the coolant mixture.

The term coolant mixture as used herein is generally to be understood as meaning the glycol-based silicate-containing formulation before mixing with water.

Coolant mixtures of this type are common knowledge and described for example in Ullmann's Enzyklopädie der Technischen Chemie, 4th edition, volume 12, pages 205 et seq.

The bis(p-carboxyalkyloxyphenyl)-2,2-propanes of the formula II are prepared in a conventional manner, for example by etherifying bisphenol A with chloroacetic acid derivatives, such as a methyl ester or Na salt thereof, in the presence of an HCl acceptor, such as NaOH or Na$_2$CO$_3$, and may be converted into the alkali metal salts, in particular the sodium and potassium salts. Preference is given to isopropylidenebis(p-phenoxyacetic acid) and the sodium salt thereof.

Suitable silicates of the general formula III are in particular the silicates described in DE-A1-No. 3,440,194, which is why reference is made to said publication and the statements therein. Suitable alkali metals M are in particular potassium and, very particularly, sodium.

These silicates are obtained in a manner known per se, for example as described by J. S. Falcone jr. in Kirk-Othmer's Encyclopaedia of Chemical Technology, 3rd ed., vol. 20, p. 864, to which reference is made.

The silicate stabilizers (c) can be any desired effective compounds, for example stabilizers as described in DE-A-No. 2,912,430 or EP No. 0,061,694. Preferred stabilizers are phosphorus-silicon compounds as disclosed in DE-A1-No. 3,440,194. These compounds react with the silicates of the formula III to form organosilane-silicate copolymers.

Suitable organic phosphorus-silicon compounds are in particular those of the general formula V

where Y is a divalent aliphatic or cycloaliphatic radical of 1 to 10 carbon atoms or phenylenealkylene of 7 to 10 carbon atoms, n can be 1 or 2, in the case of n=1 X being $OR^3$ where $R^3$ is straight-chain, branched or cyclicalkyl of 1 to 13 carbon atoms, which may be interrupted by oxygen, or acyl of up to 9 carbon atoms, and $R^1$ and $R^2$ being identical or different and each being a straight-chain, branched or cyclic alkyl of 1 to 13 carbon atoms, which may be interrupted by oxygen, or aryl or aralkyl of up to 20 carbon atoms, and in the case of n=2 X being oxygen, $R^1$ being an alkali metal and $R^2$ having the abovementioned meanings.

The organic phosphorus-silicon compounds of the abovementioned formula V (for example where n=1) can be prepared by known methods:
(a) addition of dialkyl phosphites onto alkenyltrialkoxysilanes in the presence of free radical generators or
(b) reaction of di- or trialkyl phosphites with haloalkyltrialkoxysilanes.

Some representatives of this class of compounds are known and are described for example in J. Org. Chem. 25 (1960), 1191, DE-A2-No. 2,219,983 and DE-A2-No. 2,304,554 (Method a)) and also in U.S. Pat. Nos. 3,780,127 and 3,816,550 (Method b)). Further compounds may be found in the book, Organosilicon Derivatives of Phosphorus and Sulfur, by S. N. Borisov, M. G. Voronkov and E. Ya. Lukavits, Plenum Press, New York-London 1971, p. 94 ff.

Y in the abovementioned formula V is, as stated above, a divalent aliphatic or cycloaliphatic radical of 1 to 10 carbon atoms or phenylenealkylene of 7 to 10 carbon atoms.

Divalent aliphatic radicals are straight-chain or branched alkylene or alkenylene, for example methylene, ethylene, propylene, butylene, hexylene, methylpropylene, butenylene or hexenylene.

A cycloaliphatic radical is for example ethylenecyclohexylene or propylenecyclohexylene.

Phenylenealkylene is for example phenylenemethylene or phenyleneethylene.

The preferred meaning of Y is straight-chain or branched alkylene of 1 to 6 carbon atoms, particular preference being given to ethylene, propylene, butylene and isobutylene.

The preferred meaning of $R^3$ in the formula V (n=1) is alkyl of 1 to 4 carbon atoms.

$R^1$ and $R^2$ in the formula V (n=1) are preferably likewise alkyl of 1 to 4 carbon atoms.

If n is 2, $R^1$ is preferably sodium or potassium.

The organic phosphorus-silicon compounds of the formula V where n=2 are obtained by way of the abovedescribed phosphorus-silicon compounds of the formula V where n=1 which have the structural element $(R^3O)_3Si$-. They are obtained by reaction in an aqueous alkali metal hydroxide solution at from 70° to 100° C. in the course of from 10 to 20 hours. These compounds are phosphonoalkylsiloxanes.

The organosilane-silicate copolymers resulting from the reaction of the organic phosphorus-silicon compounds with the silicates can either be formed in situ in the production of the coolant formulation by reaction of the alkali metal silicates present therein with the organic phosphorus-silicon compound of the formula V in a weight ratio from 1:1 to 10:1, preferably from 2:1 to 8:1, or can also be prepared separately beforehand.

In the latter case, a corresponding amount of the organic phosphorus-silicon compound of the formula V is added to the alkali metal silicate, and the mixture is stirred at from 30° to 150° C., preferably at from 30° to 8020 C., in glycol or water or even a mixture thereof for 5-10 hours. The resulting organosilane-silicate copolymer, the silicate content of which is within the range from about 50 to 90% by weight, preferably from 65 to 90% by weight, based on the total of the two reactants, can then be added to the coolant mixture which contains the other components.

These other components present in the coolant mixture can comprise customary corrosion inhibitors, for example borates, nitrates or benzoates, benzotriazole, tolytriazole and also antifoams or other auxiliaries (cf. Ullmann, loc. cit.).

To prepare the cooling media, the coolant mixtures according to the invention are diluted with water to produce advantageously from 20 to 50% strength by volume aqueous solutions.

The coolant mixtures according to the invention have only a small corrosive effect on aluminum and are distinguished, not only in the undiluted state but also in aqueous solution, by advantageous silicate stability.

The Examples which follow serve to illustrate the invention in more detail.

The formulation according to the invention (Examples 1 and 2) gives better results in ASTM test 1384 (glassware test) than Example 1 of JA Laid-Open Application 206,676/1983 (comparative example), as can be seen in Table 1.

EXAMPLE 1

A mixture is prepared from 2.10% of the disodium salt of the acid of the formula IV

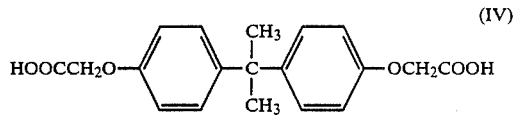

0.15% of $Na_2SiO_3.5H_2O$ 0.026% of

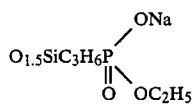

0.10% of tolytriazole
0.155% of 50% strength NaOH
0.25% of $NaNO_3$
ad 100% monoethylene glycol.

EXAMPLE 2

A mixture is prepared from
3.00% of the disodium salt of the acid of the formula IV
0.15% of $Na_2SiO_3.5H_2O$
0.026% of

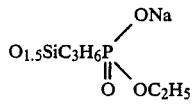

0.10% of tolytriazole
0.155% of 50% strength NaOH
ad 100% monoethylene glycol.

COMPARATIVE EXAMPLE

As per Example 1 of JA Laid-Open Application No. 206,676/1983.
A mixture is prepared from
0.64% of the triethanolamine salt of the acid of the formula IV
2.7% of triethanolamine phosphate
0.05% of sodium phosphate
0.1% of benzotriazole
1.51% of water
95% of monoethylene glycol
The following formultions were tested in ASTM test 1384:
A=25% strength by volume aqueous solution of the mixture of Example 1
B=32% strength by volume aqueous solution of the mixture of Example 2
C=25% strengt by volume aqueous solution of the mixture of the Comparative Example
D=32% strength by volume aqueous solution of the mixture of the Comparative Example Table 1 gives the weight increases or decreases (in g/m$^2$) measured under ASTM 1384.

TABLE 1

|  | Ex. 3 | Ex. 4 | Comp. Ex. 2 | Comp. Ex. 3 |
|---|---|---|---|---|
| Copper | +0.03 | −0.04 | −0.03 | +0.04 |
| Soft solder | +0.02 | −0.05 | +0.01 | +0.05 |
| Brass | +0.02 | −0.03 | −0.10 | +0.04 |
| Steel | +0.02 | −0.01 | −0.04 | −0.03 |
| Gray iron | −0.02 | −0.01 | −0.73 | −0.47 |
| Cast aluminum | +0.03 | −0.38 | −5.51 | −2.45 |

Table 1 reveals that the formulations according to the inventon offer substantially better protection not only in the case of gray iron but also in the case of cast aluminum.

We claim:

1. A glycol-based coolant mixture which is free of nitrites and phosphates, containing
   (a) 1–5% by weight of an alkali metal salt of acid II

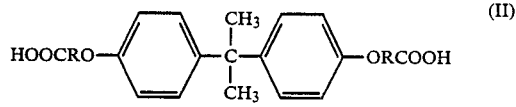

where R is a —CH$_2$—, —CH—, —CH— or CH$_2$CH$_2$CH$_2$group,
   (b) 0.1–1% by weight of a silicate of the general formula III $$(MO)_q SiO_{4-q/2}$$ (III)

where M is an alkali metal and q is from 0.4 to 4,
   (c) 0.01–0.2% by weight of a silicate stabilizer,
   (d) 0–0.5% by weight of an alkali nitrate,
   (e) 0.05–0.2% by weight of benzotriazole or tolyltriazole,
   (f) 0.5–2 % by weight of borax, and
   (g) 0.05–1 % by weight of NaOH,
all the percentages being based on the glycol present in the coolant mixture.

2. A coolant mixture as defined in claim 1, which contains as component (a) the sodium salt of isopropylidenbis(p-phenoxyacetic acid).

3. A coolant mixture as defined in claim 1, which contains as component (c) a silicate stabilizer of the formula

where Y is a divalent aliphatic or cycloaliphatic radical of 1 to 10 carbon atoms or phenylenealkylene of 7 to 10 carbon atoms, n can be 1 or 2, in the case of n=1 X being OR$^3$ where R$^3$ is straight-chain, branched or cyclic alkyl of 1 to 13 carbon atoms, which may be interrupted by oxygen, or acyl of up to 9 carbon atoms, and R$^1$ and R$^2$ being identical or different and each being a straight-chain, branched or cyclic alkyl of 1 to 13 carbon atoms, which may be interrupted by oxygen, or aryl or aralkyl of up to 20 carbon atoms, and in the case of n=2 X being oxygen, R$^1$ being an alkali metal and R$^2$ having the abovementioned meanings.

* * * * *

UNITED STATES PATENT AND TRADEMARK OFFICE
CERTIFICATE OF CORRECTION

PATENT NO. : 4,810,404
DATED : March 7, 1989
INVENTOR(S) : Gousetis et al.

It is certified that error appears in the above-identified patent and that said Letters Patent is hereby corrected as shown below:

IN THE CLAIMS

Claim 1, Line 11

"Where R is a $-CH_2-$, $-CH-$, $-CH-$ or"

should read

"Where R is a $-CH_2-$ $\underset{CH_3}{-CH-}$, $\underset{C_2H_5}{-CH-}$ or

Signed and Sealed this

Tenth Day of October, 1989

Attest:

DONALD J. QUIGG

Attesting Officer     Commissioner of Patents and Trademarks